(12) United States Patent
Liu

(10) Patent No.: US 11,736,453 B2
(45) Date of Patent: Aug. 22, 2023

(54) SECURE KEY STORAGE DEVICES

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 43 days.

(21) Appl. No.: 17/326,256

(22) Filed: May 20, 2021

(65) Prior Publication Data

US 2022/0377055 A1 Nov. 24, 2022

(51) Int. Cl.
H04L 9/40 (2022.01)
H04L 9/14 (2006.01)

(52) U.S. Cl.
CPC ............ H04L 63/0428 (2013.01); H04L 9/14 (2013.01)

(58) Field of Classification Search
None
See application file for complete search history.

(56) References Cited

U.S. PATENT DOCUMENTS

2018/0254909 A1* 9/2018 Hancock ............... H04L 9/3268
2020/0005290 A1* 1/2020 Madisetti ............. H04L 9/3239
2022/0132298 A1* 4/2022 Shiner .................. H04W 12/06

* cited by examiner

Primary Examiner — Brandon Hoffman
(74) Attorney, Agent, or Firm — Greenberg Traurig

(57) ABSTRACT

Systems, apparatuses, and methods to establish a secure channel of communication with a remote computer using a memory device having a host system. The memory device stores a first cryptographic key representative of an identity of the host system and a second cryptographic key usable to validate an identity of the remote computer. The memory device controls, based on cryptography and independent of the file system, access to the first cryptographic key and the second cryptographic key. To establish the secure channel, an application running in the host system communicates with the memory device to generate, using the first cryptographic key, a first verification code for a first message of the remote computer without revealing the first cryptographic key to the host system, and to validate, using the second cryptographic key, a second verification code generated by the remote computer for a second message from the application.

20 Claims, 9 Drawing Sheets

SECURE KEY STORAGE DEVICES

TECHNICAL FIELD

At least some embodiments disclosed herein relate to access control in general, and more particularly, but not limited to controlling access to cryptographic keys to be used by applications running on a host system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
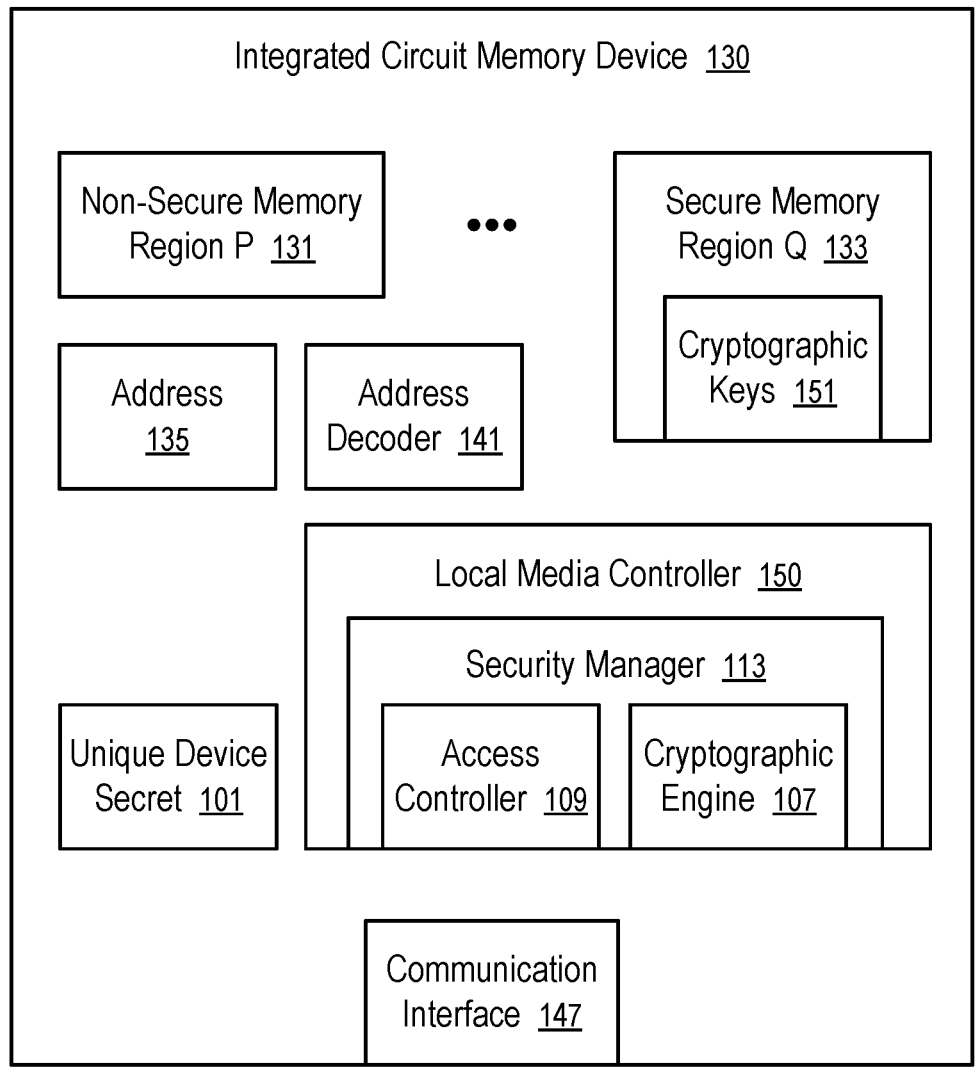
FIG. 1 illustrates an integrated circuit memory device having a security manager according to one embodiment.

At least some aspects of the present disclosure are directed to a security manager configured to secure the storage and usage of cryptographic keys configured to be used by an application running in a host system in communication with a remote computer. The cryptographic keys are stored in a memory sub-system that controls access via cryptographic keys. The memory sub-system signs messages and validates signed messages, on behalf of the application, using cryptographic keys secured within the memory sub-system. The application does not handle cryptographic keys directly; and the cryptographic keys are not exposed in the host system and/or stored in a file system outside of the memory sub-system to reduce security risk. Examples of storage devices and memory modules as memory sub-systems are described below in conjunction with FIG. 10. In general, a host system can utilize a memory sub-system that includes one or more components, such as memory devices that store data. The host system can provide data to be stored at the memory sub-system and can request data to be retrieved from the memory sub-system.

Secure Shell Protocol (SSH) can be used to establish a secure channel of communication over an unsecured network between a client and a server. Instead of using passwords for authentication between the client and the server, SSH uses asymmetric cryptography for authentication between the client and the server. For example, the client has a pair of cryptographic keys of asymmetric cryptography. One of the cryptographic keys in the pair is kept as a secret, private key of the client; and the other can be provided to the server as a public key of the client. A digital signature created using the private key can be validated via the public key to demonstrate that the digital signature is created by an entity having the private key. Since the private key is kept as a secret of the client, it can be inferred that the digital signature is created by the client. Similarly, the server can have a pair of a public key and a private key; and the client can store the public key of the server to validate a digital signature of the server to confirm and/or authenticate the identity of the server.

The cryptographic keys used in SSH to generate digital signatures and validate digital signatures can be stored at predetermined locations in a file system. However, there is a security risk of unauthorized access to the cryptographic keys stored in the file system. Further, when an application running in the host system uses a cryptographic key to generate a digital signature, there is a risk of security attacks in the attempt to access the cryptographic key during its use in the application running in the host system.

At least some aspects of the present disclosure address the above and other deficiencies and/or challenges by storing the cryptographic keys in a secure memory device. Creation and validation of digital signatures are performed within the secure memory device using the cryptographic keys to eliminate or reduce the exposure or usage of the cryptographic keys outside of the memory device.

The secure memory device can store an unique device secret representative of the memory device. A cryptographic key can be generated based at least in part on the unique device secret. A digital signature generated using the cryptographic key can be used to demonstrate the identity of the memory device represented at least in part by the unique device secret, as further discussed below in connection with FIG. 2.

The secure memory device can require a command to be signed using a cryptographic key before the command is executed to access a secure memory region. The cryptographic key is representative of the privilege to access the secure memory region. Thus, without the cryptographic key, an application or entity cannot access the secure memory region, as further discussed below in connection with FIG. 3.

The secure memory device can be configured with commands to store, generate, and use cryptographic keys on behalf of a host system, as discussed below in connection with FIGS. 4 to 7. Thus, an application running in the host system does not have to rely upon a file system outside of the memory device to store the cryptographic keys and does not have to handle the cryptographic keys in clear text in their use outside of the memory device.

FIG. 1 illustrates an integrated circuit memory device having a security manager according to one embodiment. For example, cryptographic keys 151 usable to establish an SSH connection between a host system and a remote computer can be stored in a secure memory region 133 in the memory device 130 of FIG. 1; and the security manager 113 of the memory device 130 of FIG. 1 can be configured to create digital signatures and validate digital signatures using the cryptographic keys 151 stored in the secure memory region 133 such that an application running in the host system to made an SSH connection to the remote computer does not have to handle the cryptographic keys 151 directly.

The integrated circuit memory device 130 can be enclosed in a single integrated circuit package. The integrated circuit memory device 130 includes multiple memory regions 131, . . . , 133 that can be formed in one or more integrated circuit dies.

A memory region (e.g., 131 or 133) can be allocated for use by the host system as a partition or a namespace. Memory locations in the memory region (e.g., 131 or 133) can be specified by the host system via an address of Logical Block Addressing (LBA); and the memory device 130 can include an address map that specifies the relation between LBA addresses in a partition or namespace and physical addresses of corresponding memory cells used to provide the storage space allocated to the partition or namespace. In some implementations, the memory device 130 is configured in a memory sub-system (e.g., 110 illustrated in FIG. 10); and a memory sub-system controller 115 can be configured to perform the address mapping for the memory device 130.

A typical memory cell in a memory region (e.g., 131, . . . , 133) can be programmed to store one or more bits of data.

The memory device 130 has a local media controller 150, which can implement at least a portion of a security manager 113.

The security manager 113 of the memory device 130 can include an access controller 109 and a cryptographic engine 107.

The cryptographic engine 107 can be implemented via a logic circuit and/or instructions or microcode to perform cryptographic calculations, such as applying a cryptographic hash function to a data item to generate a hash value, encrypting a data item to generate cipher text using a cryptographic key, decrypting cipher text to recover a data item using a corresponding cryptographic key, generating a cryptographic key of symmetric cryptography and/or a pair of cryptographic keys of asymmetric cryptography, etc.

The access controller 109 controls access to at least one of the memory regions 131, . . . , 133 and/or other functions of the memory device 130 based on cryptographic keys that are representative of access privileges.

For example, the security manager 113 can control access to a secure memory region 133 based on a cryptographic key that is generated based on a secret 101 of the integrated circuit memory device 130 and/or a cryptographic key representative of an owner or an authorized user of the memory device 130. For example, when a request or command to write data into the secure memory region 133 is received in the integrated circuit memory device 130, the security manager 113 verifies whether the request is from a requester having the cryptographic key. If no, the security manager 113 may reject the write request. To demonstrate that the request is from an authorized requester, the requester can digitally sign the request, or a challenge message, using the cryptographic key. When the security memory device 130 determines that the digital signature is made using the correct cryptographic key, the requester is seen to have the permission to write the data into the secure memory region 133. For example, the memory device 130 can store a cryptographic key 151 that is used to authenticate the digital signature of the signed request/command.

The memory device 130 can be configured to use different cryptographic keys 151 to access control different commands. For example, one cryptographic key 151 can be representative of the privilege to have a security command executed in the memory device 130; and the security command is used to specify that another cryptographic key 151 is representative of the privilege to read and/or write in a secure memory region 133. For example, the memory device 130 can have multiple secure memory regions (e.g., 133); and access to each of the secure memory regions (e.g., 133) can be controlled via a separate cryptographic key 151.

For example, the memory device 130 can have a unique device secret 101 that represents an identity of the memory device 130; and a cryptographic key 151 derived from the unique device secret 101 can be representative of an owner privilege to operate the memory device 130 and thus have security commands executed in the memory device.

In general, the secure memory region 133 can have different security requirements for different types of accesses (e.g., read, write, erase). For example, the secure memory region 133 can be configured to require digital signatures verifiable via the cryptographic key 151 to write or change data in the secure memory region 133 but does not require a signed command to read the data from the secure memory region 133. Alternatively, the secure memory region 133 can be configured to require digital signatures verifiable via the cryptographic key 151 to read, write, and/or change data in the secure memory region 133. Alternatively, the secure memory region 133 can be configured to require digital signatures verifiable via different cryptographic keys for different operations, such as read, write, change, erase, etc., in the secure memory region 133.

The integrated circuit memory device 130 has a communication interface 147 to receive a command having an address 135. In response to the address 135 identifying a secure memory region (e.g., 133) that is configured with access control, the security manager 113 uses the cryptographic engine 107 to perform cryptographic operations for the verification that the request is from a requester having the cryptographic key authorized for the access to the memory region 133, before providing memory data retrieved from the memory region 133 using an address decoder 141. The address decoder 141 of the integrated circuit memory device 130 converts the address 135 into control signals to select a group of memory cells in the integrated circuit memory device 130; and the local media controller 150 of the integrated circuit memory device 130 performs operations to determine the memory data stored in the memory cells at the address 135.

Figure 2:
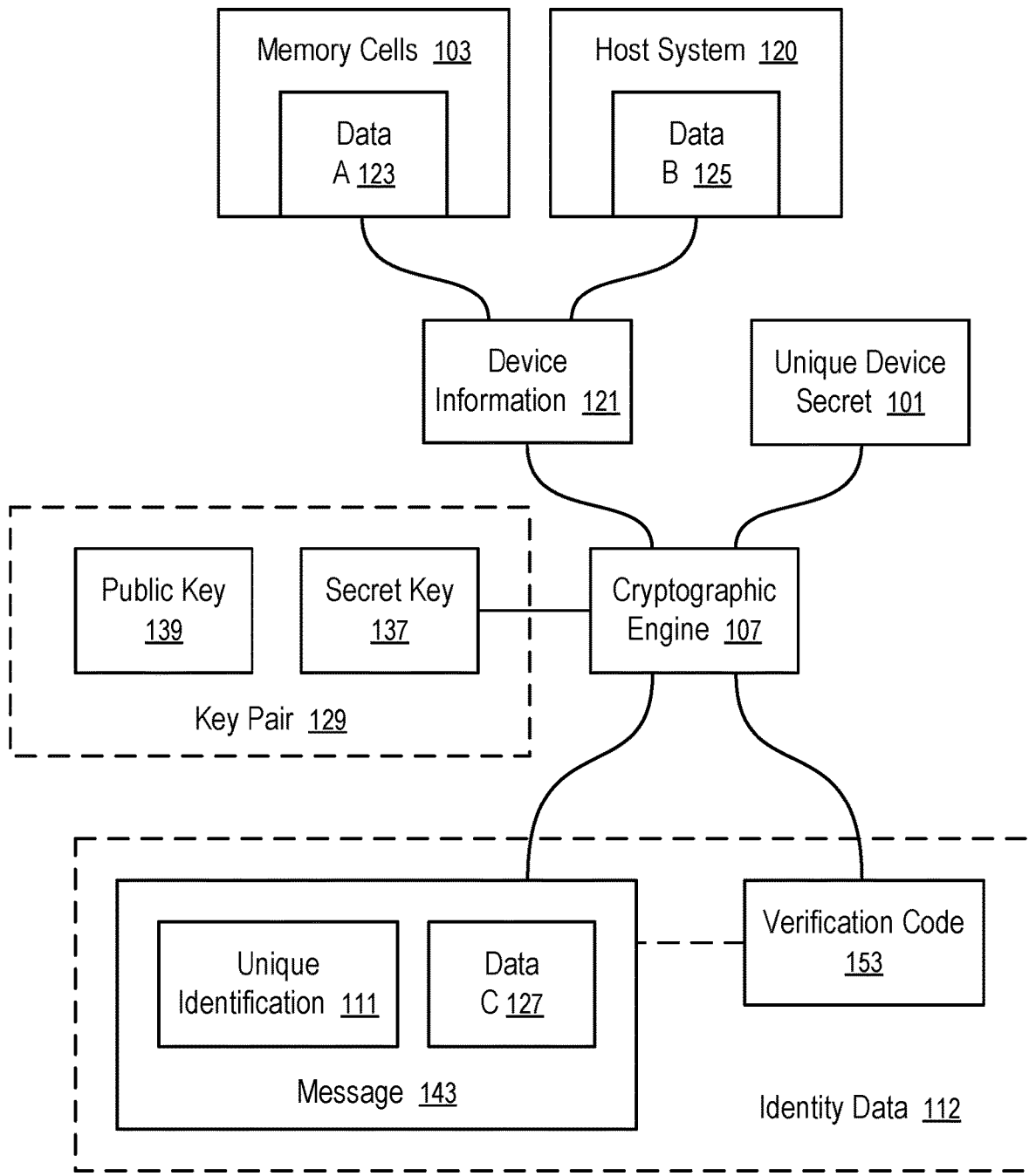
FIG. 2 illustrates the generation of identity data in an integrated circuit memory device according to one embodiment.

FIG. 2 illustrates the generation of identity data in an integrated circuit memory device according to one embodiment. For example, the technique of FIG. 2 can be implemented in the memory device 130 of FIG. 1.

In FIG. 2, the cryptographic engine 107 of a memory device 130 (e.g., as in FIG. 1) is used to generate at least a secret key 137 using its unique device secret 101 and device information 121.

For example, when asymmetric cryptography is used, the secret key 137 is a private key of a cryptographic key pair 129. An associated public key 139 is generated together with the private key using the cryptographic engine 107.

Alternatively, when symmetric cryptography is used, the secret key 137 can be generated and used without a public key 139 and without the key pair 129.

In some implementations, multiple key pairs 129 are generated and used. For example, when a method of Device Identity Composition Engine (DICE) and Robust Internetof-Things (RIoT) is used, a first pair of asymmetric keys is referred to as device identification keys; and a second pair of asymmetric keys is referred to as alias keys. The private device identification key can be used to certify the authenticity of the alias keys and then immediately deleted and purged from the memory device 130 and to safeguard its secrecy, especially when the generation or use of the private device identification key occurs at least in part in the host system 120. The alias keys can be used in authentication in further transactions and/or communications. For example, the private device identification key can be generated at a boot time and used to sign certificates, such as a certificate of the alias public key, and then deleted. After the identity of the memory device 130 and the authenticity of the public alias key are validated or confirmed using the certificates signed using the private device identification key as the secret key 137, the private alias key can then be used as the secret key 137 of the memory device 130 in subsequent operations, until the host system 120 reboots.

For example, the data 123 stored in the memory cells 103 for the device information 121 can include a set of instructions (e.g., software, firmware, operating system, application) to be executed by the processing device 118 of the host system 120 to which the communication interface 147 of the memory device 130 is connected.

For example, the data 123 can include a cryptographic hash value of the set of instructions. For example, a known hash value of the set of instructions can be stored in the memory cells 103; and the current hash value of the set of instructions can be computed for comparison with the known hash value. If the two hash values agree with each other, the integrity of the set of instructions is verified; and the hash value of the integrity of the set of instructions can be used as part of the device information 121 to compute the secret key 137.

Alternatively, the current hash value of the set of instructions stored in the memory cells 103 can be used directly in the calculation of the secret key 137. If the instructions have changed (e.g., due to data corruption and/or tampering or hacking), the validation of the secret key 137 by a security server will fail.

Optionally, the data 123 can include an identification of the set of instructions, such as a hash value of the source code of the instructions, a name of the software/firmware package represented by the instructions, a version number and/or a release date of the package, etc.

Optionally, the data 123 can include trace data stored into the memory cells 103 during the process of building and/or customizing the computing system having the host system 120 and the memory device 130. For example, when the memory device 130 is assembled into a component device (e.g., a memory sub-system), a piece of trace data representative of the manufacturer of the component device, the model of the component device, and/or the serial number of the component device is stored into the memory cells 103 as part of the device information 121. Subsequently, when the component device is assembled into the computing system, a piece of trace data is added into the memory cells as part of the device information 121. Further trace data can be added to the memory cells 103 as part of the device information 121 to reflect the history of the memory device 130 for the individualization of the identity of the memory device 130.

Optionally, the device information 121 can further include data 125 received from the host system 120 to which the communication interface 147 of the memory device 130 is connected.

For example, the computing system can have at least the host system 120 and the memory device 130. Some of the components in the host system 120 may be removed or replaced. At the time of booting up the host system 120, a portion of the instructions stored the memory cell 103 is executed to collect data 125 about the components that are present in the host system 120 at the boot time. Thus, the device information 121 can represent a particular configuration of software/data and hardware combination of the memory device 130 and/or the host system 120. The secret key 137 generated based on the device information 121 and the unique device secret 101 represent the identity of the memory device 130 with the particular configuration.

To demonstrate the identity of the memory device 130 and/or the host system 120, the cryptographic engine 107 generates a verification code 153 from a message 143 and the secret key 137.

The verification code 153 of the secret key 137 and the message 143 can be constructed and/or validated using various techniques, such as hash digest, a digital signature, or a hash-based message authentication code, symmetric cryptography, and/or asymmetric cryptography. Thus, the verification code 153 is not limited to a particular implementation.

In general, verifying whether a sender of a message (e.g., 143) has a cryptographic key (e.g., 145) involves the validation of a verification code (e.g., 153) of the message (e.g., 143). The verification code can be in the form of a hash digest, a digital signature, a Hash-based Message Authentication Code (HMAC), a Cipher-based Message Authentication Code (CMAC), etc. The verification code is generated using the cryptographic key and the message as an input to cryptographic operations such as hashing, encrypting, and/or other computations such that it is generally impractical to generate the verification code without the cryptographic key and to generate the verification code from modified version of the message. Thus, when the recipient confirms that the received verification code is valid for the received message and a cryptographic key, the recipient can conclude that the sender has the corresponding cryptographic key and the received message is the same as the message used to generate the received cryptographic key.

In some implementations, the recipient performs the validation of a verification code of a message using the same cryptographic key as used by the sender to generate the verification code. For example, the recipient uses the same cryptographic key to generate the verification code of the received message and compare the generated verification code with the received verification code. If there is a match, the received verification code is valid for the received message; and the sender can be considered to have the cryptographic key. Otherwise, the received verification code is invalid for the received message; either the received message has been changed since the generation of the verification code, or the received verification code was generated using a different cryptographic key, or both.

In some implementations, the recipient performs the validation of a verification code of a message using a public cryptographic key in a key pair; and the sender generates the verification code using a private cryptographic key in the key pair. For example, the verification code can be generated by applying a hash function to the message to generate a hash value of the message. The cipher text of the hash value obtained through encrypting the hash value performed using an encryption key can be used as the verification code. A recipient of the message and the verification code performs validation using a corresponding decryption key, which is the same as the encryption key when symmetric cryptography is used and is a different key in a key pair when asymmetric cryptography is used. After recovering a hash value from the cipher text using the decryption key, the recovered hash value can be compared to the hash value of the received message; if there is a match, the received verification code is valid for the received message; otherwise, the received verification code is invalid for the received message. Alternative, the recipient can use the encryption key to perform the validation without performing decryption. The recipient can generate the verification code of the message using the encryption key for comparison with the received verification code.

In some implementations, a message and a cryptographic key is combined to generate a hash value as the verification code, as in a technique of Hash-based Message Authentication Code (HMAC). For example, a cryptographic key can be used to generate two keys. After combining one of the two keys with the message to generate a message modified by the key, a cryptographic hash function can be applied to the key-modified message to generate a hash value, which is further combined with the other key to generate a further message. After applying the cryptographic hash function (or another cryptographic hash function) to the further message, a hash-based message authentication code is generated. A recipient of the message can use the same cryptographic key to generate the hash-based message authentication code of the received message for comparison with the received hash-based message authentication code. If there is a match, the validation is successful; otherwise, the validation fails.

In general, any techniques for generating and validating a verification code for a message from a sender and a cryptographic key used by the sender to generate the verification code can be used to determine whether the sender has the cryptographic key. The recipient is to use an appropriate cryptographic key to perform the validation, which can be the same as the cryptographic key used to generate the verification code, or in the same pair of asymmetric cryptographic key. Thus, the present disclosure is not limited to a particular technique of hash digest, digital signature, and/or hash-bashed message authentication code.

For convenience, a verification code (e.g., 153) generated for a message (e.g., 143) using a cryptographic key (e.g., 145) to represent both the message (e.g., 143) and the cryptographic key (e.g., 145) can be referred to, generally, as a digital signature of the message (e.g., 143) signed using the cryptographic key (e.g., 145), with the understanding that the verification code can be generated using various techniques, such as hash-based message authentication code.

Optionally, the message 143 can include a user identification, such as a name, an email address, a registered username, or another identifier of an owner or authorized user of the host system 120 in which the identity data 112 is generated.

Optionally, part of the message 143 can provide information in an encrypted form. For example, the information can be encrypted using a public key of the security server such that the information is not accessible to a third party.

The message 143 can be a certificate presenting the unique identification 111 of the memory device 130 and/or the host system 120. The message 143 can further present other data 127, such as a counter value maintained in the memory device 130, a cryptographic nonce, and/or other information related to the validation of the identity data 112. The memory device 130 can monotonically increase the counter value to invalidate identity data that have lower counter values to prevent replay attacks.

In some implementations, the data 127 can include part of the device information 121 used to generate the secret key 137.

In some implementations, the secret key 137 is a private alias key in a pair of asymmetric keys. The data 127 includes a certificate presenting the corresponding public alias key in the pair of asymmetric keys. The certificate presenting the public alias key is signed using a device identification key of the memory device 130. The public alias key can be used to validate the verification code 153 for the message 143 and the private alias key that is used as the secret key 137. Once the security server validates the certificate presenting the public alias key, signed using the device identification key of the memory device 130 and provided as part of the data 127, the security server can use the public alias key to validate the verification code 153 signed using the private alias key as the secret key 137. In such an implementation, the security server can use the public alias key provided in the message 143 to validate the verification code 153 without having to regenerate the pair of alias keys; and the memory device 130 can generate the alias key pair 129 using data not known to the security server.

The certificate presenting the public alias key can be generated and validated in a way as in FIG. 2, where the secret key 137 is the device identification key generated using the device information 121 and the unique device secret 101. Optionally, the memory device 130 initially provides the security server with the certificate having the public alias key. Subsequently, the memory device 130 can use the private alias key as the secret key 137 without including the public alias key in the message 143, or without including the certificate of the public alias key in the message 143.

Further, the verification of the identity of the memory device 130 can include the use of multiple secret keys and verification codes signed using the secret keys. For example, a device identification secret key can be used to initially establish the authenticity of an alias secret key and the identity of the memory device 130; and subsequently, the alias secret key can be used to validate the authenticity of the identity of the memory device 130. In general, the device identification secret key and the alias secret key can be based on asymmetric cryptography or symmetric cryptography, since the security server can generate the corresponding cryptographic keys generated by the memory device 130.

For improved security, the memory device 130 does not use the processing power outside of the memory device 130 to generate its copy of the secret key 137 and does not communicate the secret key 137 outside of the memory device 130. The generation and use of the secret key 137 are performed using the logic circuit of the cryptographic engine 107 sealed within the memory device 130.

Alternatively, part of operations to generate and use the secret key 137 can be implemented via a set of instructions stored in the memory cells 103 and loaded into the processing device 118 of the host system 120 for execution. For improved security, the secret key 137 is not communicated across the communication interface 147 in clear text; and the instructions can be configured to purge the secret key 137 from the host system 120 after the generation and/or after the use.

The identity data 112 can be generated in response to the memory device 130 being powered up, in response to a request received in the communication interface 147, and/or in response to the host system 120 boots up (e.g., by executing a boot-loader stored in the memory cells 103). The data 127 can include a count value maintained in the memory device 130. The count value increases when the operation to generate the identity data 112 is performed. Thus, a version of the identity data 112 having a count value invalidates prior versions of the identity data 112 having count values lower than the count value.

Figure 3:
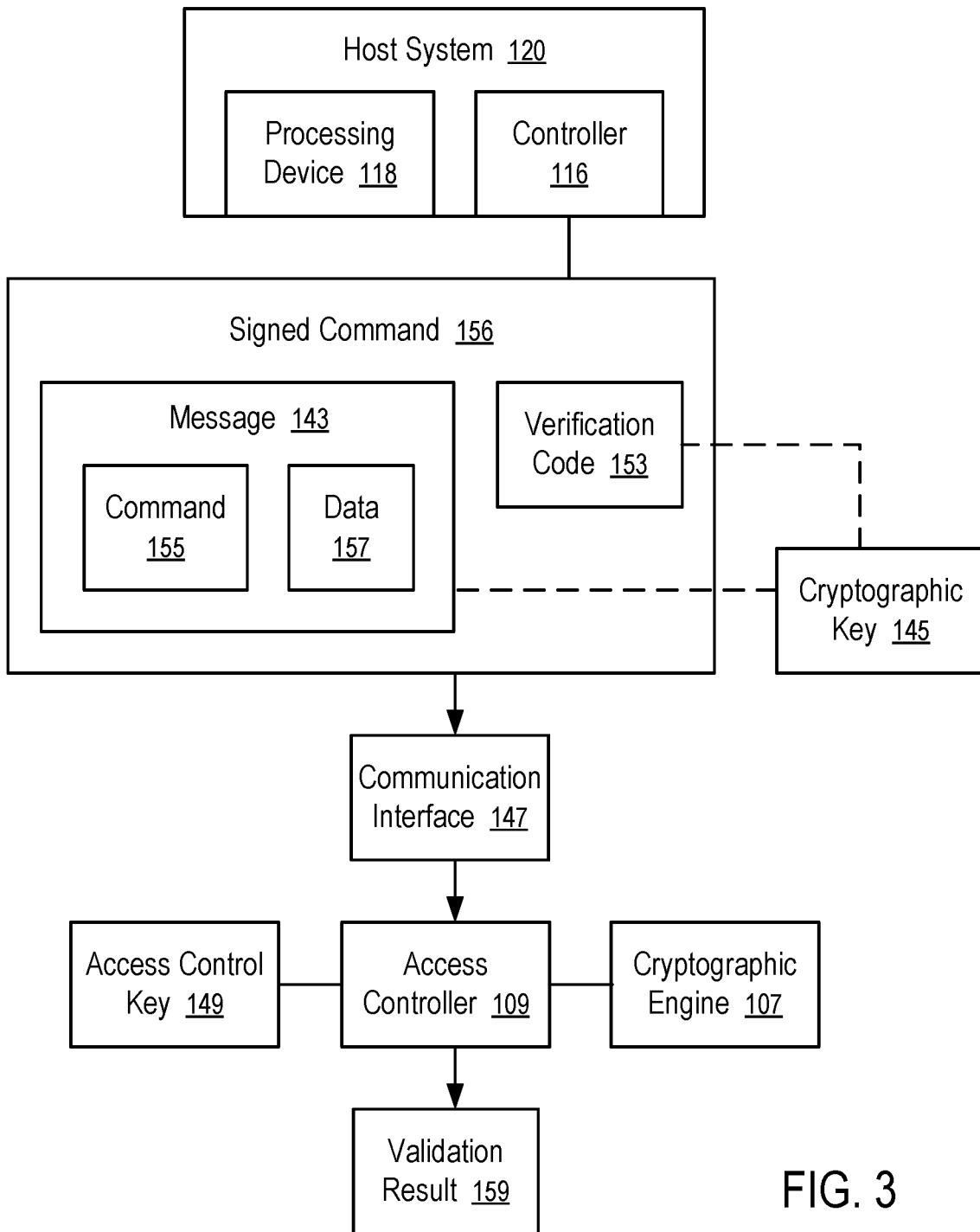
FIG. 3 illustrates a technique to control execution of a command in a memory device according to one embodiment.

FIG. 3 illustrates a technique to control execution of a command in a memory device according to one embodiment. For example, the technique of FIG. 3 can be implemented in the memory device 130 of FIG. 1.

In FIG. 3, the access controller 109 is configured with an access control key 149 to determine whether a signed command 156 received in the communication interface 147 is from an entity having the privilege to have the command 155 executed in the secure memory device 130.

When a controller 116 of a host system 120 sends a command 155 to the communication interface 147 of the memory device 130, the access controller 109 determines whether the sender of the command 155 has the privilege to request the memory device 130 to execute the command 155. The host system 120 can include one or more processing devices 118 that execute instructions implementing an operating system and/or application programs.

A cryptographic key 145 is configured to represent the privilege that is to be checked using the access control key 149. A sender of the command 155 can generate a verification code 153 from the cryptographic key 145 and a message 143 containing the command 155.

Similar to the verification code 153 discussed above in connection with FIG. 2, the verification code 153 of the cryptographic key 145 and the message 143 can be constructed and/or validated using various techniques, such as hash digest, a digital signature, or a hash-based message authentication code, symmetric cryptography, and/or asymmetric cryptography. Thus, the verification code 153 is not limited to a particular implementation; and the verification code 153 can be referred to, generally, as a digital signature of the message 143 signed using the cryptographic key 145, with the understanding that the verification code 153 can be generated using various techniques, such as hash-based message authentication code.

In FIG. 3, the access controller 109 uses a corresponding access control key 149 to validate the verification code 153 submitted to the communication interface 147 for the command 155. The access controller 109 uses the cryptographic engine 107 to generate a validation result 159 of the received message 143 and the received verification code 153. Based on the validation result 159, the access controller 109 can selectively allow the command 155 to be executed within the memory device 130 or block the execution of the command 155.

For example, the access control key 149 can be one of the cryptographic keys 151 stored in the memory device 130. Different access control keys can be used to control different privileges for executing different commands and/or for executing a command operating on different sections or regions of memory cells.

For example, one cryptographic key 145 can be representative of the privilege to have a security command executed in the memory device 130. When the security command is executed, an access control key 149 is installed (or uninstalled) in the memory device 130 for the validation of a verification code of another cryptographic key representative of the privilege to have a read command (or a write command) executed to access the secure memory region 133.

Optionally, the cryptographic key 145 is generated in the process of validating the identity of the memory device 130 based on the unique device secret 101 of the memory device 130; and a secret known between the memory device 130 and an owner of the memory device 130 allows the generation of a session key as the cryptographic key 145 to represent the privileges to have selected commands executed in the memory device 130 during a communication session. The communication session can have a time limit and/or be terminated via a command to the memory device 130.

In some implementations, a same session key used as the cryptographic key 145 representative of a privilege (e.g., to read or write the data in the secure memory region 133) and as the access control key 149 for the validation of verification codes (e.g., 153) generated using the cryptographic key 145.

In another implementations, a pair of cryptographic keys of asymmetric cryptography can be used for the session. The public key in the pair is used as the access control key 149; and the private key in the pair can be used as the cryptographic key 145 representative of the corresponding privilege.

After the installation in the memory device 130 the access control key 149 for the validation of the verification codes (e.g., 153) generated using the cryptographic key 145 representative of the privilege to read or write in the secure memory region 133, the cryptographic key 145 can be used by an authorized entity to generate the signed command 156. The signed command 156 can be transmitted to the communication interface 147 of the memory device 130 by the host system 120. After the access controller 109 validates the verification code 153 in the signed command 156, the access controller 109 allows the memory device 130 to execute the command 155.

The message 143 can include data 157 that represents restrictions on the request to execute the command 155.

For example, the data 157 can include an execution count value maintained within the memory device 130 such that verification codes generated for lower counts are invalidated.

For example, the data 157 can include a cryptographic nonce established for a specific instance of a request to execute the command 155 such that the verification code 153 cannot be reused for another instance.

For example, the data 157 can include a time window in which the verification code 153 is valid.

For example, the data 157 can include the identification of a memory region in which the command 155 is allowed to be executed.

For example, the data 157 can include a type of operations that is allowed for the execution of the command 155 in the memory device 130.

FIGS. 4-7 illustrate commands to secure cryptographic keys in a memory device for an application running in a host system according to one embodiment. For examples, the commands of FIGS. 4-7 can be implemented in a memory device 130 of FIG. 1 having the techniques of FIGS. 2 and/or 3.

Figure 4:
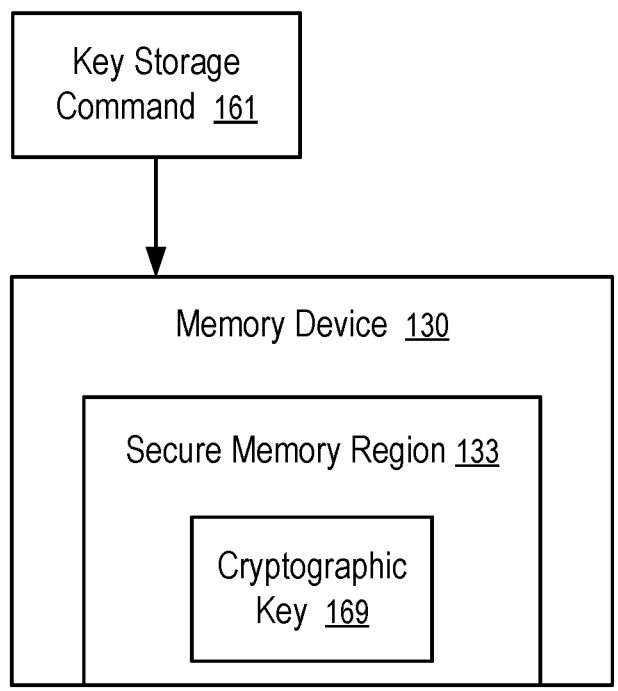
FIGS. 4-7 illustrate commands to secure cryptographic keys in a memory device for an application running in a host system according to one embodiment.

In FIG. 4, a key storage command 161 can be sent to the memory device 130 to store a cryptographic key 169 in a secure memory region 133. The key storage command 161 can be required to have a verification code 153 signed using a cryptographic key representative of a privilege to has such a key storage command 161 executed in the memory device 130.

The secure memory region 133 can be a cryptographic key table configured with a plurality of slots for installing cryptographic keys 151 in the memory device 130, including the installation of access control keys (e.g., 149) to control commands to access secure memory regions (e.g., 133) and/or other functions of the memory device 130. Each of the slots can have an identification number; and the key storage command 161 can identify a slot in which the cryptographic key 169 is stored in the secure memory region 133. The cryptographic key table can be configured by a manufacture of the memory device 130 and can be more secure than a secure memory region configured by an owner or authorized user of the memory device 130.

Alternatively, the secure memory region 133 can be a partition or a namespace allocated by an owner or authorized user of the memory device 130. The partition or namespace can be allocated from the storage capacity of the memory cells 103 in the memory device 130; and the storage location of the cryptographic key 169 can be identified via an LBA address in the partition or namespace.

In some embodiments, the memory device 130 selects a storage location of the cryptographic key 169 in response to the key storage command 161. The storage location can be provided as a response to the key storage command 161 as an identification of the cryptographic key 169. Alternatively, an unique key identification can be specified by the key storage command 161 or the memory device 130 for the cryptographic key 169 such that the cryptographic key 169 can be referred to using the key identification in the usage of the cryptographic key 169. For example, a replacement key of the cryptographic key 169 can be stored into the secure memory region 133 by referring to the key identification or the storage location.

The cryptographic key 169 can be a public key of a remote computer. Storing the cryptographic key 169 in the secure memory region 133 allows the memory device 130 to validate a digital signature/verification code generated using a private key of the remote computer.

The cryptographic key 169 can be a private key of a host system 120 or a user of the host system 120. Storing the cryptographic key 169 in the secure memory region 133 allows the memory device 130 to create a digital signature/ verification code generated using the private key.

In some embodiments, the cryptographic key 169 can be a secret key known between the host system 120 and the remote computer in creating and validating digital signatures and/or in performing encryption/decryption.

For improved security, the cryptographic key 169 is provided via the key storage command 161 in an encrypted form to the memory device 130. For example, the cryptographic key 169 can be encrypted using a session key established by a security server during the validation of the identity data 112 of the memory device 130. The memory device 130 decrypts a portion of the key storage command 161 to recover the cryptographic key 169. Thus, the cryptographic key 169 is not transmitted to the memory device 130 in clear text, especially when the cryptographic key 169 is not a public key.

In some embodiments, the key storage command 161 is same as, or a special form of, a command to install an access control key 149 for the access controller 109 to control the access to an aspect of the memory device 130.

For example, the secure memory region 133 can be allocated as a partition or namespace for communication with a remote computer; and the cryptographic Key 169 can be installed by the key storage command 161 as the access control key 149 to control read and/or write access to the secure memory region 133; and the remote computer is to use a corresponding cryptographic key 145 to generate the verification code 153 of a signed command 156 to access the secure memory region 133. As discussed above in connection with FIG. 3, the cryptographic key 145 and the access control key 149 can be the same in some implementations, and can be a pair of cryptographic keys of asymmetric cryptography in other implementations. To challenge the remote computer to demonstrate that it is in possession of the cryptographic key 145, it can be sufficient to challenge the remote compute to sign a command 155 to access the secure memory region 133 controlled by the cryptographic Key 169 that is installed as the access control key 149 for the secure memory region 133.

Figure 5:
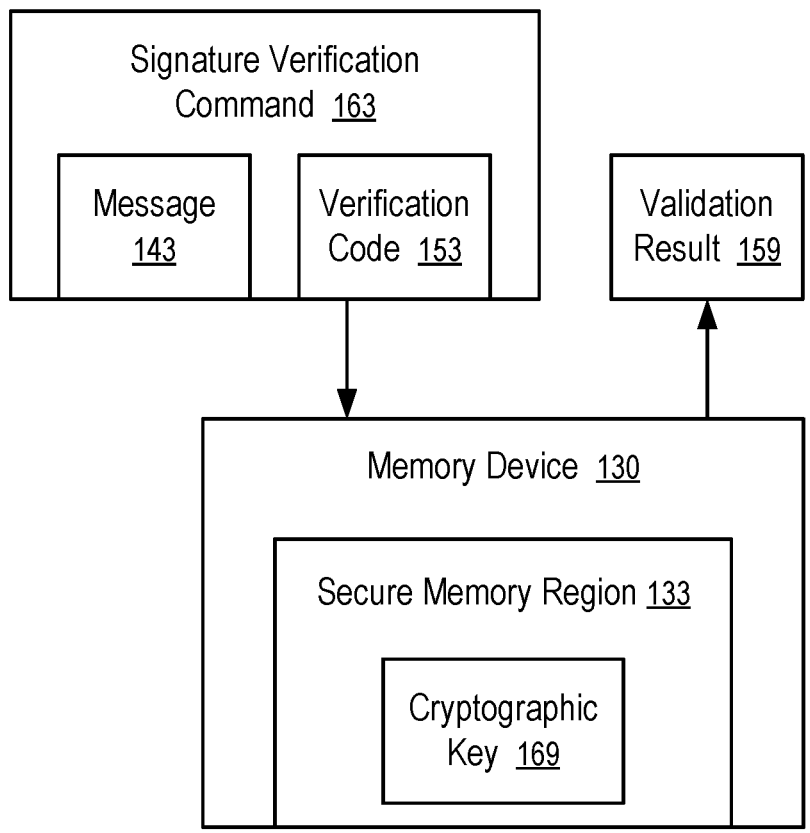

FIG. 5 illustrates a signature verification command 163 sent to the memory device 130 to determine whether the verification code 153 is generated from the message 143 and a cryptographic key (e.g., 145). In response, the memory device 130 performs cryptographic operations for the verification using a cryptographic key 169 stored in the device 130 (e.g., using a key storage command 161 of FIG. 4). If the verification code 153 is determined to be valid based on the message 143 and the cryptographic key 169, it can be inferred that the verification code 153 is created by an entity in possession of the corresponding cryptographic key (e.g., 145); and the message 143 has not been altered since the creation of the verification code 153. Otherwise, the message 143 has been altered, or the verification code 153 is not generated using the corresponding cryptographic key (e.g., 145), or both. The memory device 130 can provide the validation result 159 as a response to the signature verification command 163.

In some implementations, the signature verification command 163 can identify the cryptographic key 169 to be used for the validation using a storage location of the cryptographic key 169, or a unique key identification of the cryptographic key 169 in the memory device 130.

In some implementations, the signature verification command 163 is same as, or a special form of, a signed command 156 to access an aspect of the memory device 130.

For example, the cryptographic key 169 can be installed as an access control key 149 for a secure memory region 133 allocated as a partition or namespace for communication with the remote computer. The signature verification command 163 can be a signed command 156 for execution of a command 155 to access the secure memory region 133. If the verification code 153 is not a signature created using the corresponding cryptographic key 145 of the remote computer, the access is rejected, which indicates the signature or verification code 153 is invalid.

Figure 6:
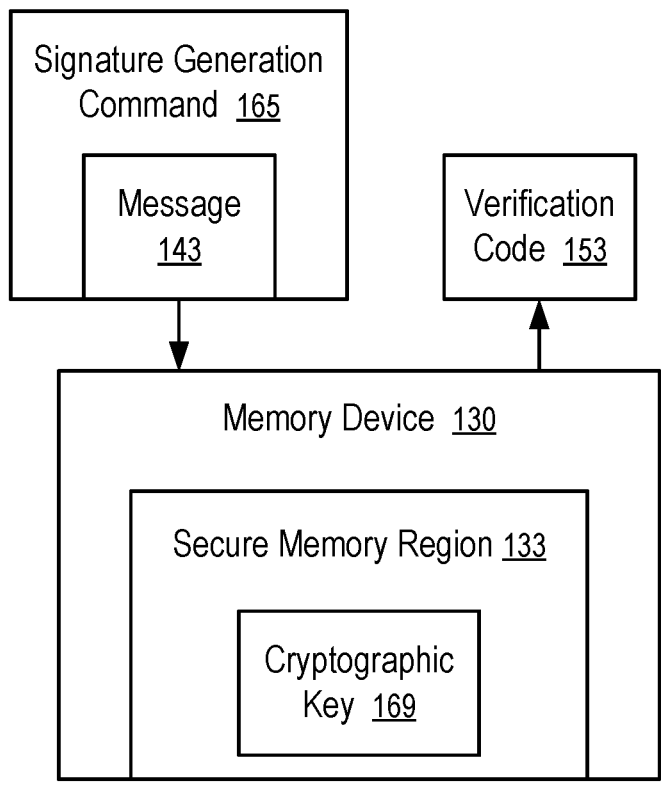

FIG. 6 illustrates a signature generation command 165 sent to the memory device 130 to generate a verification code 153 from the message 143 and the cryptographic key 169 stored in the memory device 130.

The memory device 130 can use the cryptographic engine 107 to generate the digital signature/verification code 153 for the message 143, in a way similar to the generation of the verification code 153 in the identity data 112 using the secret key 137 in FIG. 2.

In some embodiments, the cryptographic key 169 can be assigned to the host system 120 or a user of the host system 120 to represent the identity of the host system 120 or the user. The cryptographic key 169 can be store in a way similar to the storing of the secret key 137 representative of the identity of the memory device 130 and/or the host system 120 connected to the memory device 130. The message 143 can include a challenge from the remote computer that is going to determine whether the host system 120 has the cryptographic key 169 based on validating the verification code 153 against the message 143 and a corresponding key the remote computer has.

Optionally, the memory device 130 can generate the cryptographic key 169 as an identity for communication with the remote computer in a way similar to the generation of the secret key 137 in FIG. 2. Thus, the cryptographic key 169 can be generated within the memory device 130 and not communicated to outside of the memory device 130 and/or a secure section of the memory device 130.

Figure 7:
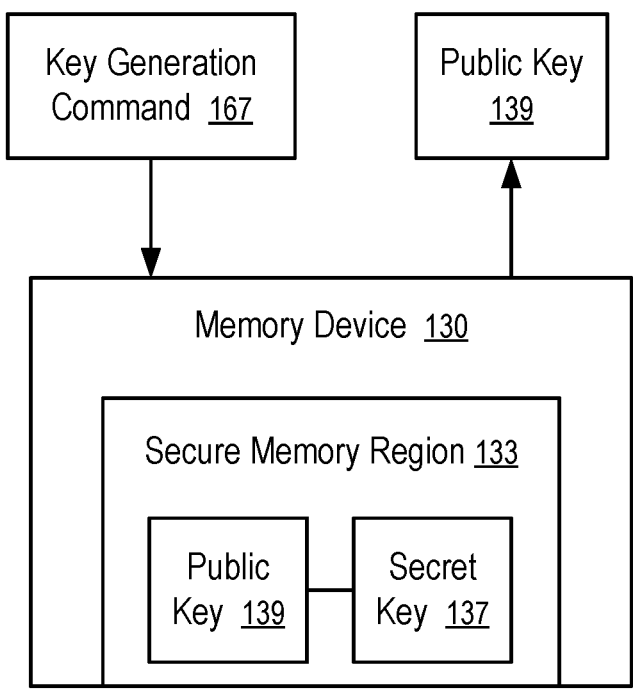

FIG. 7 illustrates a key generation command 167 sent to the memory device 130 to generate a pair of a public key 139 and a secret key 137. The key generation command 167 can be a command 155 signed using a cryptographic key 145 representative of a privilege to request the memory device 130 to generate the keys 137 and 139 representative of an entity associated with the memory device 130. For example, the keys 137 and 139 can be generated using the unique device secret 101 and/or other information provided in the key generation command 167.

When asymmetric cryptography is used, a public key 139 can be provided as a response; and a corresponding secret key 137 can be used to represent the host system 120 or its user in communication with the remote computer.

When symmetric cryptographic is used, a security server having the unique device secret 101 of the memory device 130 can independently generate the same secret key 137 and provided the secret key 137 to the remote computer in a secure manner.

In one embodiment, the secret key 137 is configured as a local identity for a secure memory region 133 for communication with the remote computer. Access to the secure memory region 133 is controlled via a cryptographic key 169 of the remote computer installed, as an access control key 149 of the secure memory region 133, using the signature generation command 165 illustrated in FIG. 6. The key generation command 167 can be configured to be signed for validation by the access control key 149 of the secure memory region 133; and a verification key for signatures generated using the secret key 137 can be provided as a response to the key generation command 167. The verification key can be in an encrypted format, encrypted using the access control key 149 for decryption by the remote computer. Thus, the verification key is not transmitted in clear text between the memory device 130 and the remote computer. The verification key can be the public key 139 when asymmetric cryptography is used, or the secret key 137 when symmetric cryptography is used.

After the installation of the secret key 137 as a location identity of the secure memory region 133 allocated for communication with the remote computer, the memory device 130 can sign a challenge message 143 using the secret key 137 in response to a signature generation command 165 illustrated in FIG. 6.

Figure 8:
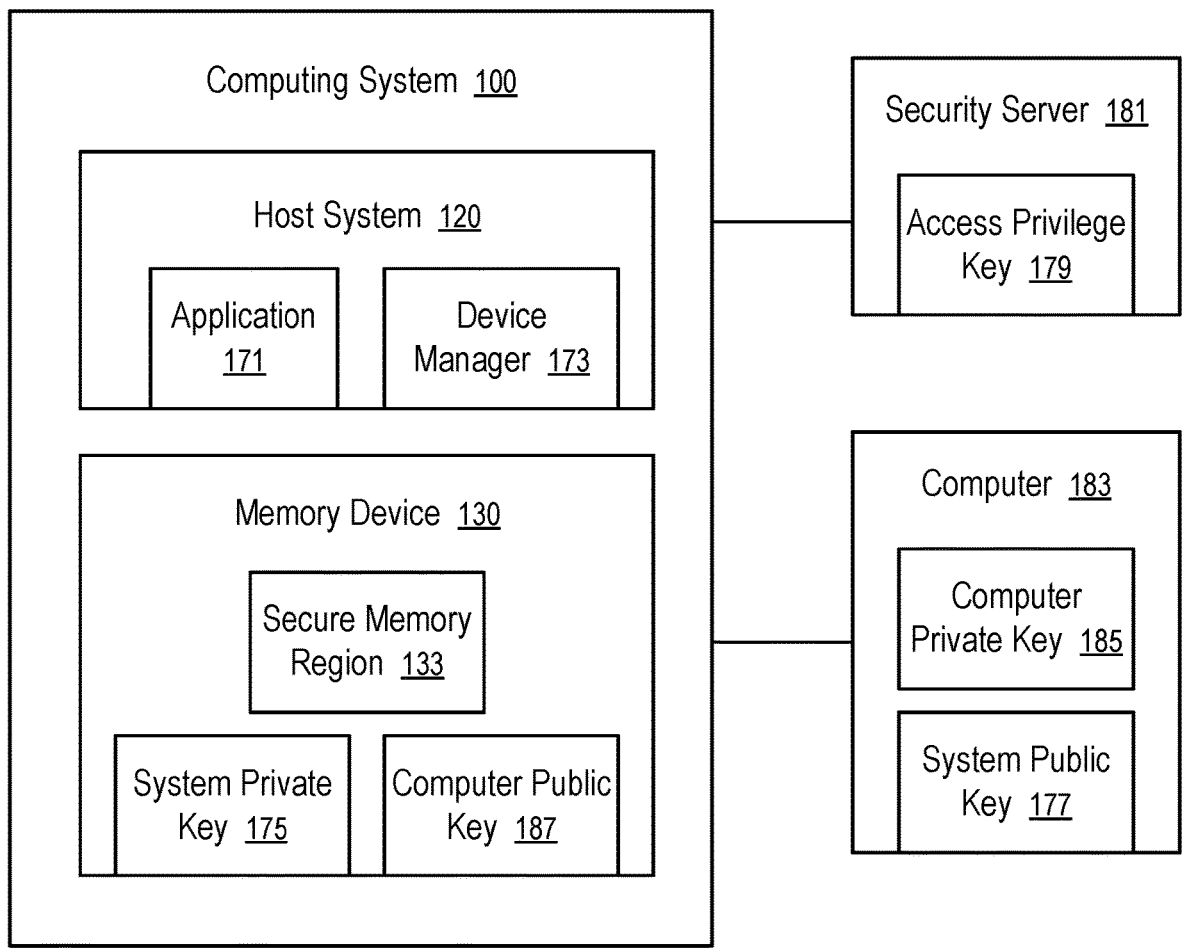
FIG. 8 illustrates a computing system to secure cryptographic keys in a memory device for an application to communicate with a remote computer according to one embodiment.

FIG. 8 illustrates a computing system to secure cryptographic keys in a memory device for an application to communicate with a remote computer according to one embodiment. For example, the memory device 130 of FIG. 1 implementing commands of FIGS. 4 to 7 can be used in the computing system 100 of FIG. 8.

In FIG. 8, the host system 120 can run an application 171 to establish a secure channel for communication with a remote computer 183 based on asymmetric cryptography. For example, the secure channel can be established using Secure Shell Protocol (SSH).

To authenticate each other, the computing system 100 has a system private key 175 representative the identity of the computing system 100; and the remote computer 183 has a computer private key 185 representative the identity of the remote computer 183. The computing system 100 stores a computer public key 187 suitable to validate digital signatures created using the computer private key 185 of the remote computer; and the remote computer 183 stores a system public key 177 suitable to validate digital signatures crated using the system private key 175 of the computing system 100.

Instead of storing the system private key 175 and the computer public key 187 in a conventional file system, the computing system 100 stores the system private key 175 and the computer public key 187 in the memory device 130 having an access controller 109 illustrated in FIG. 3. The system private key 175 and the computer public key 187 can be stored in a secure memory region 133 and/or in associate with the secure memory region 133 that is allocated for communications with the remote computer 183.

A device manager 173 can be used to configure the memory device 130. For example, the device manager 173 can facilitate communication between the memory device 130 and a security server 181 to configure the memory device 130. The security server 181 can store an access privilege key 179 to issue commands to the memory device 130 to allocate the secure memory region 133, to install the computer public key 187, and/or to generate or store the system private key 175, using commands illustrated in FIGS. 4 to 7.

For example, after a user of the device manager 173 demonstrates eligibility to access/control the memory device 130, the security server 181 can use the access privilege key 179 to generate a signed command 156 for execution in the memory device 130.

For example, a signed command 156 can be issued to allocate a partition or namespace as the secure memory region 133 for the storing of the system private key 175 and the computer public key 187, and/or for access by the remote computer 183.

For example, a signed command 156 can be a key storage command 161 to store the computer public key 187 into the secure memory region 133 and/or to install the computer public key 187 as an access control key 149 of the secure memory region 133.

For example, a signed command 156 can be a signature verification command 163 requesting the memory device 130 to verify, using the computer public key 187, whether a digital signature is signed using the computer private key 185. Alternatively, the application 171 is configured to challenge the remote computer 183 to sign, using its computer private key 185, a command 155 to access to the secure memory region 133 controlled by the computer public key 187 as an access control key 149.

For example, a signed command 156 can be a key storage command 161 to store the system private key 175 into the memory device 130, or a key generation command 167 to create the system private key 175 in the memory device 130. The memory device 130 can provide the system public key 177 in an encrypted form, encrypted using the computer public key 187, for transmission to the remote computer 183. Alternatively, the security server 181 can independently compute the system public key 177 and transmit the system public key 177 in a secure manner.

For example, a signed command 156 can be a signature generation command 165 requesting the memory device 130 to generate a digital signature on a challenge message 143 from the remote computer 183.

The application 171 is configured to communicate with the memory device 130 to use the system private key 175 and the computer public key 187.

To validate the identity of the remote computer 183, the application 171 can request the remote computer 183 to sign, using its computer private key 185, a challenge message, and requests the security server 181 to sign a signature verification command 163 to validate the signature using the computer public key 187 in the memory device 130. Alternatively, the application 171 can challenge the remote computer 183 to sign, using its computer private key 185, a command 155 to access the secure memory region 133 controlled by the computer public key 187 as an access control key 149; and the access controller 109 can determine the validation result 159 for the command 155.

To demonstrate the identity of the computing system 100, the application 171 can request the security server 181 to sign a signature generation command 165, which is transmitted to the memory device 130 for the generation of a verification code 153 as a digital signature for a challenge message from the remote computer 183.

In some embodiments, the signature generation command 165 is configured as a version of write command to store a message 143 into a secure memory region 133. Upon completion of writing the message into the secure memory region 133, the cryptographic key 169 configured for the secure memory region 133 is used to generate the verification code 153 of the message 143 as a confirmation of success in storing the message 143. Such a write command can be signed by the remote computer 183 using its computer private key 185.

In some implementation, a challenge message from the remote computer 183 for the validation of the identity of the computing system also include a challenge from the computing system 100 for the validation of the identity of the remote computer 183. If the write command signed by the remote computer is accepted by the access controller 109, after validation made using the computer public key 187, the identity of the computing system is validated; and the response to the write command provides the verification code 153 as a digital signature on the challenge message, which can be validated by the remote computer 183 using its copy of the system public key 177.

Optionally, the remote computer 183 can also store its computer private key 185 and system public key 177 in a secure memory region in a secure memory device in a way similar to the computing system 100 storing and using the system private key 175 and the computer public key 187.

Optionally, a master memory device can be used as a replacement to perform the operations discussed above to sign commands using the access privilege key 179.

Figure 9:
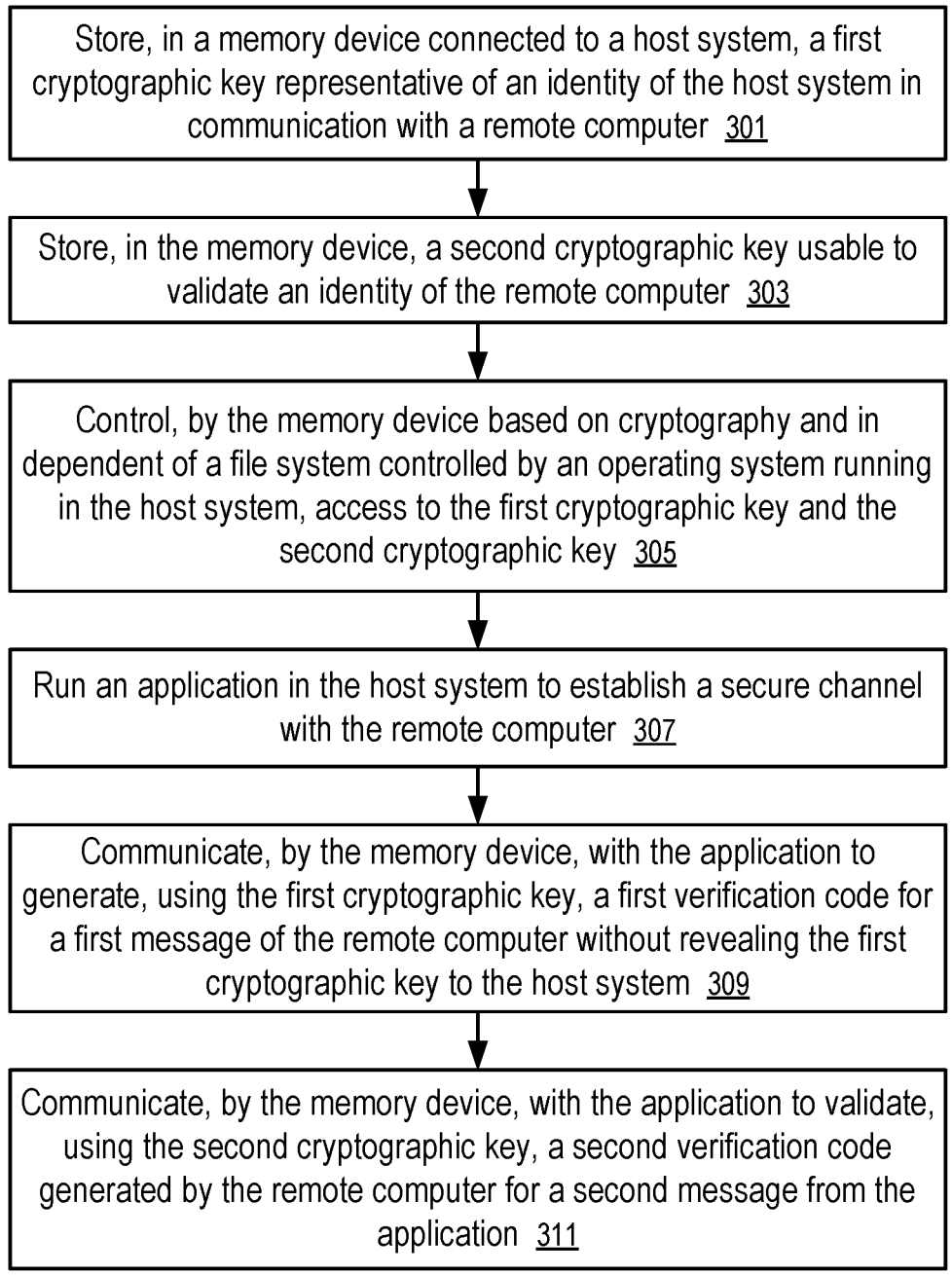
FIG. 9 shows a method to secure storage and usage of cryptographic keys according to one embodiment.

FIG. 9 shows a method to secure storage and usage of cryptographic keys according to one embodiment. The method of FIG. 9 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 9 can be implemented in a system of FIG. 8 and performed at least in part by the processing device 118 or controller 116 of the host system 120 in FIG. 3, the controller 115 and/or the controller 150 of a memory sub-system 110 of FIG. 10, or processing logic in the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, a memory device 130 connected to a host system 120 stores a first cryptographic key representative of an identity of the host system 120 in communication with a remote computer 183.

At block 303, the memory device 130 stores a second cryptographic key usable to validate an identity of the remote computer.

At block 305, the memory device 130 controls, based on cryptography and independent of a file system controlled by an operating system running in the host system, access to the first cryptographic key and the second cryptographic key.

At block 307, an application 171 runs in the host system 120 to establish a secure channel with the remote computer 183.

At block 309, the memory device 130 communicates with the application 171 to generate, using the first cryptographic key, a first verification code for a first message of the remote computer 183 without revealing the first cryptographic key to the host system 120.

At block 311, the memory device 130 communicates with the application to validate, using the second cryptographic key, a second verification code generated by the remote computer 183 for a second message from the application 171.

For example, the first cryptographic key is a private key representative of the host system for establishing the secure channel; and the second cryptographic key is a public key corresponding to a private key representative of the remote computer in establishing the secure channel.

For example, the secure channel is established according to a Secure Shell Protocol (SS H) using the first cryptographic key and the second cryptographic key.

The first cryptographic key and the second cryptographic key can be stored in a secure memory region in the memory device; and access to the secure memory region requires a command signed using a cryptographic key representative of a privilege to access the secure memory region.

Alternatively, the first cryptographic key and the second cryptographic key are stored in a cryptographic key table configured by a manufacturer of the memory device 130.

Optionally, the application 171 may obtain a copy of the first cryptographic key and/or the second cryptographic key after the application 171 provides a password or passcode to the memory device 130 with a read command.

To generate the first verification code, the application 171 can send, to the memory device 130, a first command identifying the first message. In response, the memory device 130 generates, by using the first cryptographic key within the memory device 130, the first verification code as a response to the first command.

To validate the second verification code, the application 171 can send, to the memory device 130, a second command identifying the second message and the second verification code. In response, the memory device 130 validates, by using the second cryptographic key within the memory device 130, the second verification code as a response to the second command.

In some implementations, the first cryptographic key is stored in the memory device 130 in response to a command providing the first cryptographic key. In other implementations, the first cryptographic key is stored in the memory device 130 in response to a command requesting the memory device to generate the first cryptographic key.

For example, the memory device 130 can generate, using a unique device secret 101 secured within the memory device 130 and/or information provided in the command to generate the first cryptographic key, a pair of cryptographic keys of asymmetric cryptography. The pair of cryptographic keys can include the first cryptographic key as the private key representative of the host system and a public key corresponding to the first cryptographic key. The memory device 130 can provide the public key corresponding to the first cryptographic key as a response to the command to generate the first cryptographic key. For example, the public key corresponding to the first cryptographic can be provided by the memory device 130 in cipher text encrypted using the second cryptographic key or another key that can be decrypted by the remote computer 183.

In some implementations, a command signed using an access privilege key 179 representative of a privilege to operate the memory device 130 is sent via a device manager 173 to the memory device 130. After validates the digital signature signed using the access privilege key 179 for the command, the memory device executes the command to allocate a secure memory region 133 for communications with the remote computer 183. To further configured the secure memory region 133 for communications with the remote computer 183, the device manager 173 can send a command, signed using the access privilege key 179, to cause the memory device 130 to install the second cryptographic key as an access control key of the secure memory region 133. For example, a read or write command to access the secure memory region 133 can then be signed by a key of the remote computer 183 for validation through the second cryptographic key for execution in the memory device 130.

Further, in some implementations, the device manager 173 can further send a command, signed using the access privilege key 179, to install the first cryptographic key for the secure memory region 133, such that in response to a command to write data into the secure memory region 133, the memory device 130 is configured to use the first cryptographic key to generate a verification code of the data as a digital signature signed using the first cryptographic key. The memory device 130 can provide the digital signature in a response to the command to write the data into the secure memory region 133. Optionally, the command to write the data into the secure memory region 133 can be signed using a cryptographic key of the remote computer verifiable via the second cryptographic key.

For example, to validate the second verification code can include: receiving, in the memory device 130 from the application 171, a command signed by the remote computer 183 to access the secure memory region 133; and to generate the first verification code can include receiving, in the memory device 130 from the application 171, a command signed by the remote computer 183 to write the first message into the secure memory region 133.

Figure 10:
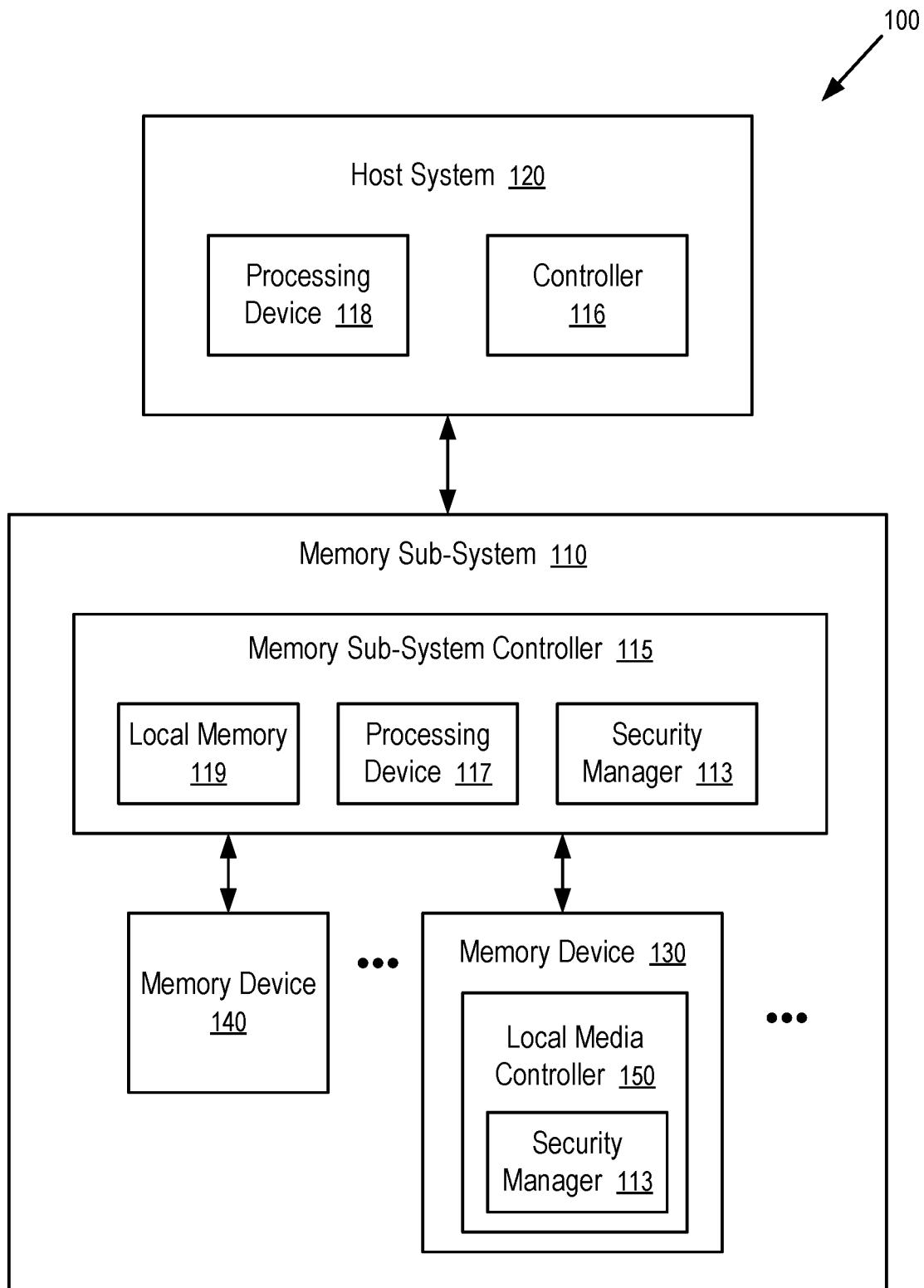
FIG. 10 illustrates an example computing system having a memory sub-system in accordance with some embodiments of the present disclosure.

FIG. 10 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 10 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 10 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 10 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 discussed above. In some embodiments, the controller 115 and/or the local media controller 150 in the memory sub-system 110 can include at least a portion of the security manager 113. In other embodiments, or in combination, the controller 116 and/or the processing device 118 in the host system 120 can include at least a portion of the security manager 113. For example, the controller 115, the controller 116, and/or the processing device 118 can include logic circuitry implementing the security manager 113. For example, the controller 115, or the processing device 118 (e.g., processor) of the host system 120, can be configured to execute instructions stored in memory for performing the operations of the security manager 113 described herein. In some embodiments, the security manager 113 is implemented in an integrated circuit chip disposed in the memory sub-system 110. In other embodiments, the security manager 113 can be part of firmware of the memory sub-system 110, an operating system of the host system 120, a device driver, or an application, or any combination therein.

Figure 11:
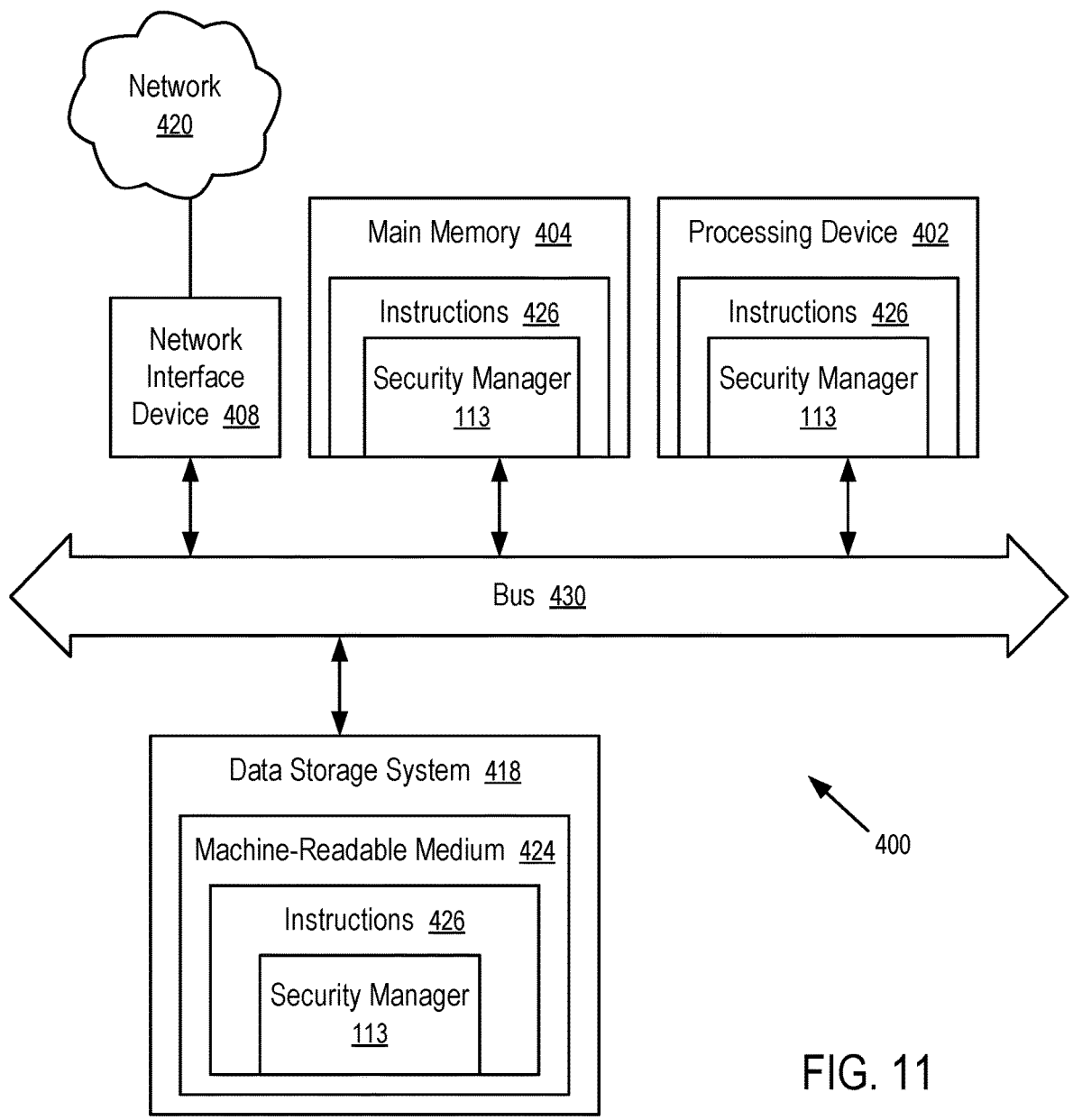
FIG. 11 is a block diagram of an example computer system in which embodiments of the present disclosure can operate.

FIG. 11 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 10) that includes, is coupled to, or utilizes a memory sub-system (e.g., the memory sub-system 110 of FIG. 10) or can be used to perform the operations of a security manager 113 (e.g., to execute instructions to perform operations corresponding to the security manager 113 described with reference to FIGS. 1-10). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 10.

In one embodiment, the instructions 426 include instructions to implement functionality corresponding to a security manager 113 (e.g., the security manager 113 described with reference to FIGS. 1-10). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    storing, in a memory device connected to a host system, a first cryptographic key representative of an identity of the host system in communication with a remote computer;
    storing, in the memory device, a second cryptographic key usable to validate an identity of the remote computer;
    controlling, by the memory device based on cryptography and independent of a file system controlled by an operating system running in the host system, access to the first cryptographic key and the second cryptographic key; and
    during an application running in the host system to establish a secure channel with the remote computer,
        communicating, by the memory device, with the application to generate, using the first cryptographic key, a first verification code for a first message of the remote computer without revealing the first cryptographic key to the host system; and
        communicating, by the memory device, with the application to validate, using the second cryptographic key, a second verification code generated by the remote computer for a second message from the application.

2. The method of claim 1, wherein the first cryptographic key is a private key representative of the host system; and the second cryptographic key is a public key corresponding to a private key representative of the remote computer.

3. The method of claim 2, wherein the secure channel is established according to a Secure Shell Protocol (SSH) using the first cryptographic key and the second cryptographic key.

4. The method of claim 3, wherein the first cryptographic key and the second cryptographic key are stored in a secure memory region in the memory device; and access to the secure memory region requires a command signed using a cryptographic key representative of a privilege to access the secure memory region.

5. The method of claim 3, wherein the first cryptographic key and the second cryptographic key are stored in a cryptographic key table configured by a manufacturer of the memory device.

6. The method of claim 3, wherein the communicating with the application to generate the first verification code includes:
    receiving, in the memory device, a first command identifying the first message; and
    generating, within the memory device using the first cryptographic key, the first verification code as a response to the first command.

7. The method of claim 6, wherein the communicating with the application to validate the second verification code includes:
    receiving, in the memory device, a second command identifying the second message and the second verification code; and validating, within the memory device using the second cryptographic key, the second verification code as a response to the second command.

8. The method of claim 3, further comprising:
receiving, in the memory device, a command to generate the first cryptographic key;
generating, within the memory device, a pair of cryptographic keys of asymmetric cryptography, including the first cryptographic key as the private key representative of the host system and a public key corresponding to the first cryptographic key; and
providing the public key corresponding to the first cryptographic key as a response to the command to generate the first cryptographic key.

9. The method of claim 8, wherein the public key corresponding to the first cryptographic key is provided in cipher text encrypted using the second cryptographic key.

10. The method of claim 3, further comprising:
receiving, in the memory device, a command to allocate a secure memory region for communications with the remote computer;
validating, by the memory device, that a verification code of the command is generated using a cryptographic key representative of a privilege to operate the memory device; and
receiving, in the memory device, a command to install the second cryptographic key as an access control key of the secure memory region.

11. The method of claim 10, further comprising:
receiving, in the memory device, a command to install the first cryptographic key for the secure memory region, wherein in response to a command to write data into the secure memory region, the memory device is configured to use the first cryptographic key to generate a verification code of the data using the first cryptographic key and provide the verification code in a response to the command to write the data.

12. The method of claim 11, wherein the communicating with the application to validate the second verification code includes:
receiving, in the memory device, a command signed by the remote computer to access the secure memory region.

13. The method of claim 11, wherein the communicating with the application to generate the first verification code includes:
receiving, in the memory device, a command signed by the remote computer to write the first message into the secure memory region.

14. A computing apparatus, comprising:
a memory device having memory cells and an access controller; and
a host system coupled to the memory device, the host system configured to execute instructions of an operating system controlling a file system, and an application;
wherein the memory device is configured to:
store a first cryptographic key representative of an identity of the host system in communication with a remote computer and a second cryptographic key usable to validate an identity of the remote computer; and
control, based on cryptography and independent of a file system controlled by an operating system running in the host system, access to the first cryptographic key and the second cryptographic key; and
wherein an application running in the host system to establish a secure channel with the remote computer, the application is configured to communicate, with the memory device, to:
generate, using the first cryptographic key, a first verification code for a first message of the remote computer without revealing the first cryptographic key to the host system; and
validate, using the second cryptographic key, a second verification code generated by the remote computer for a second message from the application.

15. The computing apparatus of claim 14, wherein to generate the first verification code, the application is configured to send a command with the first message to the memory device and receive the first verification code as a response to the command.

16. The computing apparatus of claim 15, wherein the command is configured to write the first message into a memory region associated with the first cryptographic key; and the command is signed using a cryptographic key verifiable using the second cryptographic key.

17. The computing apparatus of claim 16, wherein the second cryptographic key is installed in the memory device as an access control key of the memory region.

18. A memory device, comprising:
memory cells formed on one or more integrated circuit dies;
a logic circuit implementing a cryptographic engine and an access controller; and
a communication interface connectable to a host system, wherein when a first cryptographic key representative of an identity of the host system in communication with a remote computer and a second cryptographic key usable to validate an identity of the remote computer are stored in a memory region having a portion of the memory cells, the access controller is configured to control, based on cryptography and independent of a file system controlled by an operating system running in the host system, access to the first cryptographic key and the second cryptographic key;
wherein during an application running in the host system communicates with the remote computer to establish a secure channel, the memory device receive commands from the application to:
generate, using the first cryptographic key, a first verification code for a first message of the remote computer without revealing the first cryptographic key to the host system; and
validate, using the second cryptographic key, a second verification code generated by the remote computer for a second message from the application.

19. The memory device of claim 18, configured, in response to at least one command received in the communication interface, to:
allocate a memory region for communication with the remote computer;
install the second cryptographic key as an access control key of the memory region; and
install the first cryptographic key to generate, in response to a command to write data into the memory region, a digital signature of the data signed using the first cryptographic key as a response to the write command.

20. The memory device of claim 19, wherein the access controller is configured to validate that the at least one command has been signed using a cryptographic key representative of a privilege to operate the memory device, prior to allowing the memory device to execute the at least one command.

\* \* \* \* \*